United States Patent Office 2,735,831
Patented Feb. 21, 1956

2,735,831

POLYMERIZATION OF ACRYLONITRILE IN THE PRESENCE OF MODIFIED PREFORMED POLYMERS

Harry W. Coover, Jr., Kingsport, Tenn., assignor to Eastman Kodak Company, Rochester, N. Y., a corporation of New Jersey No Drawing. Application October 21, 1952,
Serial No. 316,065

17 Claims. (Cl. 260—45.5)

This invention relates to the polymerization of acrylonitrile in the presence of certain modified preformed polymers, and to articles obtained therefrom.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 percent by weight of acrylonitrile can be drawn into fibers susceptible to dyeing, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 percent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogenous condition of the spinning solution and the fact that it is generally known that polyacrylonitrile is not compatible with many organic substances.

I have now made the unusual and valuable discovery that stable solutions of acrylonitrile polymers which do not separate into distinct layers on standing, and from which fibers of homogenous character can be spun, can be prepared by polymerizing acrylonitrile in the presence of preformed interpolymers which have not been separated from their polymerization medium prior to the addition of monomeric acrylonitrile. These fibers are characterized by a softening point higher than the interpolymers referred to above, and do not exhibit the segmentation defect shown by many of the fibers prepared from certain prior art materials comprising polyacrylonitrile.

It is known that polymers of acrylonitrile can be prepared by interpolymerizing acrylonitrile with a monoethylenically unsaturated compound and adding additional acrylonitrile during the course of the polymerization. The interpolymers thus obtained are subject to many of the deficiencies of the interpolymers referred to above in that their softening points are too low to permit their use in the preparation of synthetic fibers and yarns. My new polymeric compositions are distinguished therefrom in that the interpolymerization of the original polymerization mixture of my invention is substantially complete before the added acrylonitrile is subjected to polymerization conditions. The acrylonitrile thus is able to extend the length of the interpolymer chain with units consisting entirely of acrylonitrile, and the product has the valuable tenacity and high-softening properties of polyacrylonitrile, while the new and important property of dye susceptibility is imparted thereto.

It is, therefore, an object of my invention to provide acrylonitrile polymer compositions. A further object of my invention is to provide methods for making these modified polymer compositions. Still another object is to provide homogeneous solutions obtained from these polymer compositions comprising acrylonitrile. Another object is to provide fibers from these homogeneous solutions, and methods for making these fibers. Other objects will become apparent from a consideration of the following description and examples.

According to my invention, I provide polymer compositions comprising acrylonitrile by polymerizing acrylonitrile in the presence of a preformed interpolymer which has not been separated from its polymerization medium prior to the addition of the acrylonitrile. When the preformed interpolymer is separated from its polymerization medium, and redissolved in a solvent, or suspended in an aqueous medium, all of the reactive groups in the interpolymer chain are apparently closed, or rendered inactive, and polymerization of the acrylonitrile with this separated interpolymer causes a substantial lowering of softening point in certain instances. When the acrylonitrile is added to the preformed interpolymer before separation of the interpolymer from the reaction medium, a certain number of groups in the interpolymer chain apparently remain reactive, and the acrylonitrile is able to increase the length of the interpolymer chain. The compositions obtained according to my invention are not to be confused with simple interpolymers which have a low softening point as has been noted above.

In accordance with the invention, I prepare my new resinous compositions or polymers by the following polymerization steps (1) by first heating in the presence of a polymerization catalyst a dispersion of from 1 to 10 parts by weight of a monomer selected from the group consisting of acrylamides, maleamides, fumaramides, itaconamides, citraconamides, maleamates, fumaramates, itaconamates, citraconamates, acrylates and vinyl carboxylic esters, until the monomer has substantially completely homopolymerized, (2) then adding to the polymerization reaction mixture containing the homopolymer from 1 to 10 parts by weight of a different monomer selected from the above mentioned group, and heating the reaction mixture until the added monomer has substantially completely polymerized, and (3) then adding to the polymerization reaction mixture containing the composite polymer from 1 to 40, but preferably from 30 to 40, parts by weight of acrylonitrile or a mixture of acrylonitrile consisting of from 85.0 to 99.5 percent by weight of acrylonitrile and from 15.0 to 0.5 percent by weight of a different monoethylenically unsaturated, polymerizable compound containing a I. 

group, or more especially a

II. 

group, and heating the reaction mixture until the added monomer has substantially polymerized. The composite final polymers contain from 5 to 95 percent by weight of acrylonitrile.

However, generally similar resinous compositions or polymers can also be prepared by changing the order of the polymerization steps. For example, the stated amount of acrylonitrile or mixture of acrylonitrile with the other monomer can first be substantially completely homopolymerized or copolymerized to the "live" homopolymer or copolymer, and then the stated amount of any one of the mentioned acrylamides, maleamides, fumaramides, etc., can be added for the second step of polymerization and a different one of the mentioned acrylamides, maleamides, fumaramides, etc. can be added for the third and final step of polymerization. The acrylonitrile can also be added in the second polymerization step, i. e. polymerized or copolymerized in the presence of any one of the preformed and "live" polymers of the above mentioned compounds. Similarly any one of the above mentioned compounds can enter into the polymerization in any of the three polymerization steps. In any event, the final products contain from about 5 to 95 percent by weight of acrylonitrile, based on the weight of the final composition or polymer.

Those of our new compositions contain from 60 to 95 percent by weight of acrylonitrile have been found to be especially useful as film-forming materials. Those containing acrylamides are outstanding and preferred. However, all of our compositions in the 5 to 95 percent range of acrylonitrile content are compatible with each other, with polyacrylonitrile and with other acrylonitrile polymers containing 85 percent or more by weight of acrylonitrile, in all proportions, but the most useful mixtures comprise from 5 to 95 parts by weight of one or more of the polymers of the invention with from 95 to 5 parts by weight of polyacrylonitrile. Monomers whose polymers were not heretofore compatible with polyacrylonitrile can thus be polymerized according to my invention to give polymers which are highly compatible with polyacrylonitrile.

The acrylamides whose polymers can be advantageously used in my invention comprise those represented by the following general formula:

III. 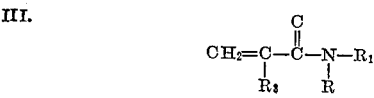

wherein R and R₁ each represents a hydrogen atom or alkyl group containing from 1 to 4 carbon atoms (e. g. methyl, ethyl, propyl, isopropyl, butyl, isobutyl, etc. groups) and R₃ represents a hydrogen atom and a methyl group. Typical acrylamides include acrylamide, N-methyl acrylamide, N-ethyl acrylamide, N-isopropyl acrylamide, N-n-butyl acrylamide, methacrylamide, N-methyl methacrylamide, N-ethyl methacrylamide, N-isopropyl methacrylamide, N,N-dimethyl acrylamide, N,N-diethyl acrylamide, N,N-dimethyl methacrylamide, etc.

As a maleamides, I can advantageously use those represented by the following general formula:

IV. 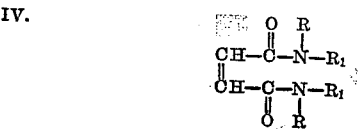

wherein R and R₁ are as above defined. Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N,N'-diethyl maleamide, etc.

As fumaramides, I can advantageously use those represented by the following general formula:

V. 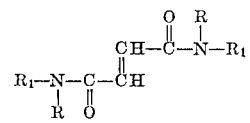

wherein R and R₁ are as above defined. Typical fumaramides include fumaramide, N-ethyl fumaramide, N-ethyl-fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'-butyl fumaramide, N,N'-tetramethyl fumaramide, N,-N'-tetraethyl fumaramide, N,N-dimethyl-N',N'-diethyl fumaramide, etc.

As itaconamides, I can advantageously use those represented by the following general formula:

VI. 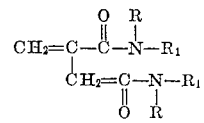

wherein R and R₁ are as above defined. Typical itaconamides include itaconamide, N-methyl itaconamide, N-ethyl itaconamide, N-n-butyl itaconamide, N,N'-dimethyl itaconamide, N,N'-diethyl itaconamide, the N,N'-butyl itaconamides, N,N'-tetramethyl itaconamide, etc.

As citraconamides I can advantageously use those represented by the following general formula:

VII. 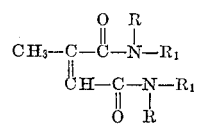

wherein R and R₁ are as above defined. Typical citraconamides include citraconamide, N-methyl citraconamide, N-ethyl citraconamide, N-n-butyl citraconamide, N,N'-dimethyl citraconamide, N,N'-diethyl citraconamide, the N,N'-butyl citraconamides, N,N'-tetramethyl citraconamide, etc.

The maleamates whose polymers I can advantageously use comprise those represented by the following general formula:

VIII. 

wherein R and R₁ are as above defined and R₂ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, I can advantageously use those represented by the following formula:

IX. 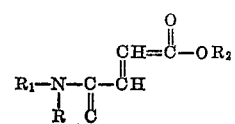

wherein R, R₁ and R₂ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, I can advantageously use those represented by the following general formulas:

X.
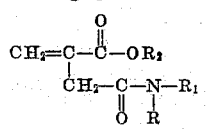

and

XI.
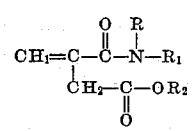

wherein R, R₁ and R₂ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamate, etc.

As citraconamates, I can advantageously use those represented by the following general formulas:

XII.
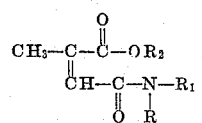

and

XIII.
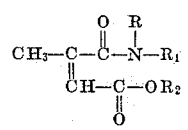

wherein R, R₁ and R₂ are as above defined. Typical citraconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

The acrylates whose polymers I can advantageously use comprise those represented by the following general formula:

XIV.
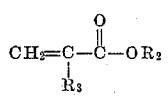

wherein R₂ and R₃ are as above defined. Typical esters include methyl acrylate, ethyl acrylate, propyl acrylate, n-butyl acrylate, isobutyl acrylate, methyl methacrylate, ethyl methacrylate, propyl methacrylate, the butyl methacrylates, etc.

As vinyl carboxylic esters I can advantageously use those represented by the following general formula:

XV.
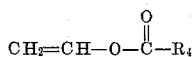

wherein R₄ represents an alkyl group containing from 1 to 3 carbon atoms. Typical esters include vinyl formate, vinyl acetate, vinyl propionate, vinyl butyrate, etc.

The monoethylenically unsaturated, polymerizable organic compounds represented by Formulas I and II above include the compounds represented by Formulas III to XV, in addition to other monomeric compounds coming within the scope thereof, such as styrene, α-methylstyrene, p-acetaminostyrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinyl phthalimide, vinylsulfonamide, ethylene, isobutylene, etc. Especially useful polymerizable compounds coming with the scope of Formula II are those containing amido nitrogen, for example, the acrylamides.

Advantageously the polymerizations are carried out in aqueous medium, although other reaction media such as organic solvents can be employed. For example, a polymerization medium consisting of aqueous acetone or other aqueous solvent can be used.

The polymerizations can be accelerated by the use of well-known polymerization catalysts commonly used in the art of polymerization, and my invention is not to be limited to any particular catalyst material. Catalysts which I have found particularly useful comprise the peroxide polymerization catalysts such as organic peroxides (e. g. benzoyl peroxide, acetyl peroxide, lauryl peroxide, urea peroxide, triacetone peroxide, alkyl percarbonates, tert. butyl hydroperoxide, etc.), hydrogen peroxide, perborates (e. g. alkali metal perborates such as sodium and potassium perborates, ammonium perborate, etc.), persulfates (e. g. alkali metal persulfates such as sodium and potassium persulfates, ammonium persulfate, etc.). Other catalysts such as the ketazines, azines, etc. can be used. The amount of catalyst used can be varied depending on the monomer, amount of diluent, etc. The catalyst can be added in amount sufficient to complete all three steps of my polymerization process or added stepwise, i. e. an amount sufficient to complete only the first step of polymerization, additional catalyst being then added with the added monomers to complete polymerization of the added monomers in the second and final steps of polymerization. The latter type of procedure provides a readier means for regulating the molecular weight distribution of the polymer composition.

The temperatures at which the process of my invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated esters, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

The following examples will serve to illustrate further the manner whereby I practice my invention.

*Example 1*

9 grams of N,N'-dimethylfumaramide were suspended in 100 cc. of distilled water along with 0.1 gram of ammonium persulfate, 0.1 gram of sodium bisulfite and 1 gram of a sulfonated ether (Triton 720). The resulting emulsion was allowed to polymerize for 12 hours at 50° C., then cooled down to room temperature. 0.5 gram of acrylamide along with 0.01 gram of ammonium persulfate and 0.01 gram of sodium bisulfite were added and the polymerization was continued for an additional 5 hours at 45° C. After cooling down to room temperature, a solution of 0.5 gram of acrylonitrile and 0.01 gram of ammonium persulfate and 0.01 gram of sodium bisulfite in 10 cc. of water was added and the polymerization completed by tumbling at 50° C. for 8 hours. The emulsion was broken by the addition of a concentrated salt solution and the precipitated polymer was filtered, washed and dried. On analysis the polymer composition was found to contain approximately 5 percent by weight of acrylonitrile. Fibers obtained from a mechanical mixture containing 30 percent by weight of the polymer obtained and 70 percent by weight of polyacrylonitrile by extruding a solution of the mixture in N,N-dimethylformamide into a precipitating bath had a tenacity of 3.5 grams per denier, an extensibility of 21 percent, a sticking temperature of 205° C. and shrank 7 percent in boiling water.

*Example 2*

1 gram of N,N,N'N'-tetramethylfumaramide was emulsified in 80 cc. of water containing 2 grams of potassium laurate, 0.01 gram of potassium persulfate and 0.01 gram of sodium bisulfite. The emulsion was allowed to polymerize for 8 hours at 25° C. There were then added 1 gram of vinyl acetate, 0.01 gram of potassium persulfate and 0.01 gram of sodium bisulfite and the emulsion was allowed to polymerize for 8 hours at 25° C. There was then added 8 grams of acrylonitrile, 0.1 gram of potassium persulfate and 0.1 gram of sodium bisulfite and the emulsion was allowed to polymerize for an additional 8 hours at 25° C. The polymer product was then separated from the reaction mixture by filtration, yielding 9.6 grams. On analysis, the polymer was found to contain approximately 10 percent by weight of N,N,N'N'-tetramethylfumaramide. The polymer can be mixed with polyacrylonitrile or copolymers of acrylonitrile containing 85 percent or more acrylonitrile in all proportions and dissolved to give stable solutions which do not separate into distinct layers on standing and from which fibers and films of homogeneous character can be spun, extruded or cast.

*Example 3*

1.9 grams of N,N'-di-isopropyl fumaramide were suspended in 18 cc. of water along with 0.02 gram of ammonium persulfate, 0.02 gram of sodium bisulfite and 1 gram of a sulfonated ether (Triton 720). The resulting emulsion was allowed to polymerize for 16 hours at 40° C., then cooled to room temperature and 0.1 gram of N-methyl methacrylamide was added along with 0.01 gram of potassium persulfate. The polymerization was then continued for an additional 6 hours at 45° C. A dispersion containing 8 grams of acrylonitrile, 0.1 gram of ammonium persulfate and 0.1 gram of potassium bisulfite and 2 grams of a sulfonated ether (Triton 720) in 50 cc. of water were added. After tumbling the resulting emulsion at 50° C. for 2 hours, the polymer product was precipitated by the addition of a sodium chloride solution to give 9.8 grams of product containing approximately 19 percent by weight of N,N'-di-isopropyl fumaramide. Fibers obtained from a solution of a mechanical mixture of 5 parts polyacrylonitrile and 95 parts of the above polymer and extruding the solution into a precipitating bath had a tenacity of 3.2 grams per denier, an extensibility of 20 percent, a sticking temperature of 210° C. and shrank only 7 percent in boiling water.

*Example 4*

1.8 grams of N,N'-diethylmaleamide were emulsified in 90 cc. of water containing 1 gram of a sulfonated ether (Triton 720) and 0.03 gram of potassium persulfate. The emulsion was heated at 50° C. for 16 hours and the emulsion was cooled to room temperature. There were then added 0.2 gram of fumaramide along with 0.01 gram of potassium persulfate. The emulsion was then heated for an additional 5 hours at 45° C. There was then added 8 grams of acrylonitrile, 0.1 gram of potassium persulfate and 0.1 gram of sodium bisulfite. The reaction mixture was then allowed to stand at 25° C. for 16 hours. The precipitated polymer weighed 9.7 grams and contained approximately 18 percent by weight of N,N'-diethylmaleamide on analysis. Fibers were then spun by extruding a solution of the polymer in N,N-dimethylformamide into a precipitating bath. The fibers thus obtained had a tenacity of 3.2 grams per denier, an extensibility of 20 percent, a sticking temperature of 215° C. and shrank only 8 percent in boiling water. The fibers remained soft after being subjected to the usual dye baths.

*Example 5*

1.7 gram of N,N'-dimethyl maleamide were suspended in 18 cc. of water along with 0.01 gram of ammonium persulfate, 0.01 gram of sodium bisulfite and 1 gram of a sulfonated ether (Triton 720). The resulting emulsion was allowed to polymerize for 12 hours at 35° C., then cooled down to room temperature and 0.3 gram of N-methyl methyl maleamate along with 0.01 gram of potassium persulfate were added. The polymerization was continued for an additional 3 hours at 50° C. The emulsion was then cooled down to room temperature and a dispersion containing 8 grams of acrylonitrile, 0.1 gram of ammonium persulfate and 0.1 gram of sodium bisulfite and 2 grams of a sulfonated ether (Triton 720) in 50 cc. of water were added. After tumbling the reaction mixture at 50° C. for 2 hours, the polymer product was precipitated the addition of an aqueous solution of sodium chloride to give 9.7 grams of polymer product containing approximately 80 percent acrylonitrile on analysis. Fibers were then spun from the product obtained above by extruding a solution of the polymer in N,N-dimethylformamide into a precipitating bath. The fibers thus obtained had a tenacity of 3.6 grams per denier, an extensibility of 22 percent, a sticking temperature of 210° C. and shrank 7 percent in boiling water. Fibers obtained from a solution of a mechanical mixture of 10 parts polyacrylonitrile and 90 parts of the above polymer and extruding the solution into a precipitating bath had a tenacity of 3.6 grams per denier, an extensibility of 19 percent and a sticking temperature of 225° C. and shrank 7 percent in boiling water.

*Example 6*

1 gram of N-methyl methyl fumaramate was emulsified in 50 cc. of water containing 1 gram of a sulfonated ether (Triton 720) and 0.01 gram of ammonium persulfate. The resulting emulsion was heated at 50° C. for 7 hours, cooled to room temperature and 1 gram of methyl acrylate along with 0.01 gram of ammonium persulfate and 0.01 gram of sodium bisulfite were added. The reaction mixture was allowed to heat at 35° C. for an additional 6 hours. The emulsion was then cooled to room temperature and a mixture containing 8 grams of acrylonitrile, 0.1 gram of ammonium persulfate and 0.1 gram of sodium bisulfite were added. The reaction mixture was allowed to stand at 25° C. for 12 hours. The precipitated polymer weighed 9.4 grams and contained approximately 80 percent acrylonitrile by weight based on analysis. Fibers obtained from this polymer had a tenacity of 3.3 grams per denier, an extensibility of 20 percent, a sticking temperature of 225° C. and shrank 8 percent in boiling water. Fibers obtained from a solution of a mechanical mixture of 20 parts of polyacrylonitrile and 80 parts of the above polymer and extruding the solution into a precipitating bath had a tenacity of 3.3 grams per denier, an extensibility of 19 percent, a sticking temperature of 220° C. and shrank 7 percent in boiling water.

Example 7

3 grams of N,N-dimethyl ethyl fumaramate were suspended in 40 cc. of water containing 0.03 gram of ammonium persulfate, 0.03 gram of sodium bisulfite and 2 grams of a sulfonated ether (Triton 720). The resulting emulsion was allowed to polymerize for 16 hours at 35° C., then cooled to room temperature and 1 gram of N-methyl methyl citraconamate along with 0.01 gram of ammonium persulfate and 0.01 gram of sodium bisulfite were added. The emulsion was heated for an additional 5 hours at 35° C., then cooled to room temperature and a dispersion containing 6 grams of acrylonitrile, 0.1 gram of potassium persulfate, 0.1 gram of sodium bisulfite and 2 grams of a sulfonated ether (Triton 720) in 50 cc. of water was added. There was thus obtained 9.6 grams of a polymer product containing approximately 60 percent by weight of acrylonitrile based on analysis. The polymers can be mixed with polyacrylonitrile in all proportions and dissolved to give stable solutions which do not separate into distinct layers on standing and from which fibers and films of homogeneous character can be spun, extruded or cast.

Example 8

0.9 gram of N-isopropyl methyl maleamate were emulsified in 10 cc. of water containing 0.4 grams of potassium laurate, 0.01 gram of potassium persulfate and 0.01 gram of sodium bisulfite. The emulsion was heated for 6 hours at 35° C. and 0.1 gram of methyl fumaramate, 0.01 gram of potassium persulfate, and 0.5 gram of potassium laurate in 25 cc. of water were added and the polymerization was continued an additional 4 hours at 35° C. The emulsion was cooled to room temperature and 19 grams of acrylonitrile, 0.1 gram of potassium persulfate, 0.1 gram of sodium bisulfite and 2 grams of potassium laurate in 75 cc. of water were added and the polymerization was continued for an additional 8 hours at 35° C. The precipitated polymer product was obtained in a 92 percent yield and contained approximately 95 percent by weight of acrylonitrile based on analysis. It was soluble in N,N-dimethylformamide or N,N-dimethylacetamide. Fibers obtained from these solutions had a sticking temperature of 225° C. The polymer can be mixed with polyacrylonitrile or copolymers of acrylonitrile containing 85 percent or more acrylonitrile in all proportions and dissolved to give stable solutions which do not separate into distinct layers on standing and from which fibers and films of homogeneous character can be spun, extruded or cast.

Example 9

7 grams of N-methyl methyl itaconamate were suspended in 75 cc. of water containing 0.1 gram of ammonium persulfate, 0.1 gram of sodium bisulfite and 5 grams of a sulfonated ether (Triton 720). The emulsion was allowed to polymerize for 16 hours at 35° C., at the end of which time polymerization seemed to be complete. The reaction mixture was then cooled and 1 gram of N-methyl methacrylamide along with 0.1 gram of ammonium persulfate were added. The polymerization was continued for an additional 7 hours at 35° C. The reaction mixture was again cooled and added to a dispersion containing 2 grams of acrylonitrile, 0.05 gram of ammonium persulfate, 0.05 gram of sodium bisulfite and 1 gram of a sulfonated ether (Triton 720) in 30 cc. of water. After tumbling the reaction mixture for 4 hours at 35° C., there were obtained 9.7 grams of polymer containing approximately 19.5 percent acrylonitrile based on analysis. The polymers can be mixed with polyacrylonitrile or copolymers of acrylonitrile containing 85 percent or more acrylonitrile in all proportions and dissolved to give stable solutions which do not separate into distinct layers on standing and from which fibers and films of homogeneous character can be spun, extruded or cast.

Example 10

1 gram of N,N-dimethyl methyl itaconamate, 0.05 gram of potassium persulfate and 1 cc. of 7-ethyl-2-methyl undecane-4-sulfonic acid sodium salt (Tergitol No. 4) were added to 30 cc. of water. The resulting emulsion was then tumbled at 50° C. for 12 hours, at the end of which time 1 gram of methyl citraconamate and 0.01 gram of potassium persulfate were added. The reaction mixture was then tumbled for an additional 5 hours at 50° C. The resulting emulsion was then cooled to room temperature and 8 grams of acrylonitrile and 0.1 gram of potassium persulfate in 70 cc. of water were added. The reaction mixture was then tumbled for an additional 12 hours at 50° C. The resulting polymer was obtained in a 92 percent yield and contained approximately 79.5 percent acrylonitrile based on analysis. It was soluble in either N,N-dimethylformamide or N,N-dimethylacetamide. Fibers obtained from a solution of a mechanical mixture of 70 parts of an acrylonitrile polymer containing 92 percent acrylonitrile and 8 percent isopropenyl acetate and 30 parts of the above polymer and extruding the solution into a precipitating bath had a tenacity of 3.3 grams per denier, an extensibility of 26 percent, a sticking temperature of 215° C. and shrank 6 percent in boiling water.

Example 11

2 grams of methyl citraconamate, 0.05 gram of ammonium persulfate and 0.05 gram of sodium bisulfite and 1 gram of a sulfonated ether (Triton 720) were added to 50 cc. of distilled water. The resulting emulsion was then heated for 8 hours at 45° C. with tumbling. To the cooled solution, 1 gram of N-isopropyl acrylamide along with 0.05 gram of ammonium persulfate were added. The polymerization was continued for an additional 6 hours at 45° C. A solution of 17 grams of acrylonitrile, 0.2 gram of ammonium persulfate and 0.2 gram of sodium bisulfite in 50 cc. of distilled water was then added. The reaction mixture was then heated for an additional 8 hours at 35° C. The resulting polymer was obtained in a 93 percent yield and contained approximately 85.3 percent acrylonitrile by weight based on analysis. Fibers obtained by extruding a solution of the polymer obtained in the above example in a solvent such as N,N-dimethylformamide into a precipitating bath had a tenacity of 3.6 grams per denier, an extensibility of 20 percent, a sticking temperature of 220° C. and shrank 8 percent in boiling water. Fibers obtained from a solution of a mechanical mixture of 60 parts polyacrylonitrile and 40 parts of the above polymer and extruding the solution into a precipitating bath had a tenacity of 3.8 grams per denier, an extensibility of 20 percent, a sticking temperature of 225° C. and shrank 8 percent in boiling water.

Example 12

9 grams of N-methyl isopropyl citraconamate were suspended in 80 cc. of water containing 0.1 gram of ammonium persulfate, 0.1 gram of sodium bisulfite and 3 grams of a sulfonated ether (Triton 720). The resulting emulsion was then tumbled for 8 hours at 50° C. and after cooling to room temperature, 0.5 gram of acrylonitrile, 0.05 gram of ammonium persulfate and 0.05 gram of sodium bisulfite were added. The polymerization was continued for an additional 3 hours at 40° C. and then cooled to room temperature. 0.5 gram of N-methyl methyl citraconamate along with 0.01 gram of ammonium persulfate were added. The polymerization was completed by heating an additional 6 hours at 35° C. The resulting polymer was obtained in a 97 percent yield and contained approximately 5 percent acrylonitrile or copolymers of acrylonitrile containing 85 percent or more acrylonitrile in all proportions and dissolved to give stable solutions which do not separate into distinct layers on standing, and from which fibers and films of homogeneous character can be spun, extruded or cast.

Example 13

1 gram of N,N-dimethyl butyl citraconamate were suspended in 50 cc. of water containing 0.01 gram of ammonium persulfate, 0.01 gram of sodium bisulfite and 2 grams of a sulfonated ether (Triton 720). The resulting emulsion was then tumbled for 6 hours at 50° C. and after cooling to room temperature, 1 gram of acrylonitrile, 0.05 gram of ammonium persulfate and 0.05 gram of sodium bisulfite were added. The polymerization was continued for an additional 6 hours at 35° C. and again cooled to room temperature. 8 grams of N-ethyl methyl maleamate suspended in 40 cc. of water containing 0.1 gram of ammonium persulfate, 0.1 gram of sodium bisulfite and 2 grams of a sulfonated ether (Triton 720) were added. The resulting emulsion was polymerized at 35° C. for an additional 12 hours. The polymer product was obtained in a 93 percent yield and contained approximately 9.8 percent acrylonitrile by weight based on analysis. Fibers obtained from a solution of a mechanical mixture of 90 parts polyacrylonitrile and 10 parts of the above polymer and extruding the solution in a precipitating bath had a tenacity of 3.2 grams per denier, an extensibility of 20 percent and a sticking temperature of 220° C. and shrank 6 percent in boiling water.

Example 14

19 grams of N-ethyl methyl maleamate were suspended in 150 cc. of water along with 0.2 gram of ammonium persulfate, 0.2 gram of sodium bisulfite and 4 cc. of 7-ethyl-2-methyl undecane-4-sulfonic acid sodium salt (Tergitol No. 4). The resulting emulsion was heated for 12 hours at 35° C. and after cooling to room temperature there were added 10 grams of acrylonitrile, 0.1 gram of ammonium persulfate and 0.1 gram of sodium bisulfite. The reaction mixture was heated for an additional 8 hours at 35° C. The emulsion was then cooled to room temperature and 1 gram of methyl maleamate along with 0.01 gram of ammonium persulfate were added. Polymerization was completed by heating at 45° C. for an additional 12 hours. There was thus obtained a polymer in a 92 percent yield which contained approximately 29.5 percent by weight acrylonitrile based on analysis. Fibers obtained from a solution of a mechanical mixture of 80 parts polyacrylonitrile and 20 parts of the above polymer and extruding the solution in a precipitating bath had a tenacity of 3.5 grams per denier, an extensibility of 21 percent, a sticking temperature of 215° C. and shrank 7 percent in boiling water.

Example 15

1 gram of N-methyl methacrylamide was dissolved in 50 cc. of water along with 0.02 gram of potassium persulfate and 0.02 gram of sodium bisulfite. The solution was allowed to polymerize for 16 hours at 25° C. There was then added 1 gram of vinyl acetate suspended in 18 cc. of water containing 0.02 gram of ammonium persulfate and 0.01 gram of sodium bisulfite and 1 gram of a sulfonated ether (Triton 720) The polymerization was continued for an additional 6 hours at 40° C. The resulting emulsion was cooled to room temperature and there was then added 7.6 grams of acrylonitrile, 0.4 gram of N-methyl methacrylamide, 0.1 gram of potassium persulfate and 0.1 gram sodium bisulfite, and the emulsion was allowed to polymerize 8 hours at 25° C. The polymer product was then separated from the reaction mixture by filtration, yielding 9.3 grams. The polymer was readily soluble in such solvents as N,N-dimethylformamide, N,N-dimethylacetamide and γ-butyrolactone to give a clear gel-free solution. The polymer contained approximately 76 percent acrylonitrile based on analysis. Fibers obtained by extruding a solution of the polymer into a precipitating bath had a tenacity of 3.2 grams per denier, an extensibility of 25 percent and a sticking temperature of 230° C. Fibers showed excellent affinity for all classes of dyes.

Example 16

6.8 grams of acrylonitrile and 1.2 grams of vinyl acetate were emulsified in 80 cc. of water containing 0.1 gram of ammonium persulfate, 0.1 gram of sodium bisulfite and 1 gram of a sulfonated ether (Triton 720). The emulsion was heated at 35° C. for 6 hours. The emulsion was cooled to room temperature and 1 gram of vinyl acetate along with 0.01 gram of ammonium persulfate were added. The polymerization was continued for an additional 6 hours at 45° C. The emulsion was again cooled to room temperature and 1 gram of N-methyl methacrylamide along with 0.01 gram of ammonium persulfate were added. The polymerization was continued for an additional 12 hours at 35° C. The polymer product was precipitated by the addition of a sodium chloride solution to give 9.7 grams of product. The polymer contained approximately 68 percent acrylonitrile based on analysis. Fibers were then spun by extruding a solution of the polymer in N,N-dimethylformamide into a precipitating bath. The fibers thus obtained had a tenacity of 3.4 grams per denier, an extensibility of 43 percent, a sticking temperature of 195° C. and shrank only 10 percent in boiling water. The fibers showed excellent affinity for acetate dyes.

Example 17

0.9 gram of N-methylacrylamide was dissolved in 50 cc. of water containing 0.02 gram of potassium persulfate. The solution was heated at 50° C. for 16 hours and the solution cooled to room temperature. There was then added 8 grams of acrylonitrile, 1 gram of N-methylacrylamide, 0.1 gram of potassium persulfate and 0.1 gram of sodium bisulfite. The reaction mixture was then allowed to stand at 25° C. for 16 hours. There was then added 0.1 gram of acrylamide along with 0.01 gram of ammonium persulfate. The polymerization was completed by heating at 35° C. for an additional 6 hours. The precipitated polymer weighed 9.2 grams and contained approximately 79.5 percent by weight acrylonitrile on analysis. Fibers were then spun by extruding a solution of the polymer in dimethylacetamide into a precipitating bath. The fibers thus obtained had a tenacity of 3.2 grams per denier, an extensibility of 36 percent and a sticking temperature of 210° C. The fibers showed excellent affinity for all classes of dyes.

Example 18

1 gram of methacrylamide was dissolved in 50 cc. of water containing 0.03 gram of ammonium persulfate. The resulting solution was heated at 50° C. for 16 hours, cooled to room temperature and 1 gram of fumaramide along with 0.02 gram of ammonium persulfate were added. The polymerization was continued for an additional 5 hours at 50° C. The reaction mixture was cooled to room temperature and a mixture containing 7.2 grams of acrylonitrile, 0.8 gram of vinyl acetate, 0.1 gram of ammonium persulfate and 0.1 gram of sodium bisulfite was added. The reaction mixture was allowed to stand at 35° C. for 16 hours. The precipitated polymer weighed 9.3 grams and contained 10 percent by weight of methacrylamide by analysis. Fibers obtained from this polymer had a tenacity of 3.2 grams per denier, an extensibility of 35 percent and a sticking temperature of 210° C. The fibers showed excellent affinity for all classes of dyes.

Example 19

3.5 grams of vinyl acetate were suspended in 40 cc. of water containing 0.04 gram of ammonium persulfate, 0.04 gram of sodium bisulfite and 2 grams of a sulfonated ether (Triton 720). The resulting emulsion was allowed to polymerize for 16 hours at 50° C., then cooled to room temperature. 0.5 gram of N-methyl methacrylamide along with 0.01 gram of ammonium persulfate were added. The polymerization was continued for an additional 5 hours at 50° C. A dispersion containing 5.1 grams of acrylonitrile, 0.9 gram of N-methyl methacrylamide, 0.1 gram potassium persulfate, 0.1 gram of sodium bisulfite and 2 grams of a sulfonated ether (Triton 720) in 50 cc. of water was then added. The reaction mixture was then tumbled for 2 hours at 50° C. There was thus obtained 9.4 grams of polymer product containing approximately 51 percent by weight acrylonitrile on analysis.

*Example 20*

0.7 gram of citraconamide, 0.01 gram of potassium persulfate, 1 cc. of 7-ethyl-2-methyl undecane-4-sulfonic acid sodium salt (Tergitol No. 4) was added to 30 cc. of water. The resulting emulsion was tumbled at 50° C. for 12 hours, at the end of which time 0.1 gram of itaconamide along with 0.01 gram of ammonium persulfate were added. The reaction mixture was then tumbled for an additional 12 hours at 50° C. The reaction mixture was cooled to room temperature and 6.8 grams of acrylonitrile, 1.2 grams of citraconamide and 0.1 gram potassium persulfate in 70 cc. of water was added. The reaction mixture was then tumbled for an additional 12 hours at 50° C. The resulting polymer was obtained in a 92 percent yield and contained approximately 68.1 percent acrylonitrile based on analysis. The polymer was readily soluble in acrylonitrile type solvents. Fibers obtained by extruding a solution of the polymer in -butyrl lactone into a precipitating bath had a sticking temperature of 220° C. and showed excellent affinity for acetate dyes.

*Example 21*

3 grams of itaconamide, 0.1 gram ammonium persulfate, 0.1 gram sodium bisulfite and 1 gram of a sulfonated ether (Triton 720) were added to 50 cc. of distilled water. The resulting emulsion was then heated for 12 hours at 45° C. with tumbling. 0.1 gram of vinyl acetate along with 0.01 gram of ammonium persulfate were added and the polymerization continued for an additional 6 hours at 50° C. A solution of 15.3 grams of acrylonitrile, 0.2 gram of ammonium persulfate and 0.2 gram of sodium bisulfite in 50 cc. of distilled water was then added. The reaction mixture was tumbled for an additional 8 hours at 35° C. The resulting polymer was obtained in a 92 percent yield and contained approximately 83 percent acrylonitrile based on analysis. Fibers obtained by extruding a solution of the polymer obtained in the above example in a solution such as N,N-dimethylformamide into a precipitating bath had a tenacity of 3.7 grams per denier, an extensibility of 37 percent, a sticking temperature of 210° C. and shrank 7 percent in boiling water.

*Example 22*

1 gram of methyl methacrylate was suspended in 30 cc. of water containing 0.01 gram of ammonium persulfate, 0.01 gram of sodium bisulfite and 1 gram of a sulfonated ether (Triton 720). The resulting emulsion was then tumbled for 8 hours and after cooling to room temperature, 1 gram of vinyl acetate along with 0.01 gram of ammonium persulfate were added. The polymerization was continued for an additional 6 hours at 45° C. The emulsion was again cooled to room temperature and an emulsion of 7.5 grams of acrylonitrile, 0.5 gram of methyl methacrylate, 0.1 gram of ammonium persulfate, 0.1 gram of sodium bisulfite and 1 gram of a sulfonated ether (Triton 720) in 70 cc. of water was added. After tumbling the reaction mixture for an additional 8 hours at 40° C., a polymer product was obtained which contained 74.8 percent acrylonitrile based on analysis. It was soluble in N,N-dimethylformamide or dimethylacetamide. Fibers obtained from this polymer had a sticking temperature of 195° C.

*Example 23*

1.6 grams of N-isopropyl acrylamide was dissolved in 50 cc. of water containing 0.05 grams of potassium persulfate. The solution was heated for 12 hours at 50° C. and after cooling to room temperature, 0.2 gram of acrylamide along with 0.01 gram of ammonium persulfate were added and the polymerization continued for an additional 12 hours at 50° C. The reaction mixture was again cooled to room temperature and 7.8 grams of acrylonitrile, 0.2 gram of N-isopropyl acrylamide, 0.1 gram of potassium persulfate and 0.1 gram of sodium bisulfite in 50 milliliters of water were added. The reaction mixture was then heated an additional 8 hours at 35° C. The resulting polymer was readily soluble in acrylonitrile solvents and gave fibers having an extensibility of 35 percent and a sticking temperature of 205° C.

*Example 24*

9 grams of N,N'-dimethyl fumaramide were suspended in 100 cc. of distilled water along with 0.1 gram of ammonium persulfate, 0.1 gram of sodium bisulfite and 1 gram of a sulfonated ether (Triton 720). The resultant emulsion was allowed to polymerize for 16 hours at 50° C. and then cooled down to room temperature. 0.7 gram of methyl acrylate along with 0.01 gram of ammonium persulfate were then added. The polymerization was then continued for an additional 8 hours at 50° C. The emulsion was again cooled to room temperature and a solution of 0.5 gram of acrylonitrile, 0.05 gram of methacrylonitrile, 0.01 gram of ammonium persulfate and 0.01 gram of sodium bisulfite in 10 cc. of water was added and the polymerization completed by tumbling at 50° C. for 8 hours. The emulsion was broken by the addition of a concentrated salt solution and the precipitated polymer was filtered, washed and dried. Fibers obtained from a mechanical mixture containing 30 percent by weight of the polymer obtained and 70 percent by weight of acrylonitrile polymer containing 90 per cent acrylonitrile and 10 percent methacrylonitrile by extruding a solution of the mixture in N,N-dimethyl formamide into a precipitating bath had a tenacity of 3.5 grams per denier, an extensibility of 29 percent, a sticking temperature of 210° C. and shrank 9 percent in boiling water.

*Example 25*

1 gram of N,N,N'N'-tetramethyl fumaramide were emulsified in 80 cc. of water containing 2 grams of potassium laurate, 0.02 gram of potassium persulfate and 0.1 gram of sodium bisulfite. The emulsion was allowed to polymerize for 16 hours at 25° C. There was then added 7.6 grams of acrylonitrile, 0.4 gram of methyl acrylate, 0.1 gram of potassium persulfate and 0.1 gram of sodium bisulfite in the emulsion was allowed to polymerize for 8 hours at 25° C. To the emulsion, 1 gram of methyl acrylate along with 0.01 gram of ammonium persulfate and 0.01 gram of sodium bisulfite were added. The polymerization was continued for an additional 6 hours at 35° C. The polymer product was then separated from the reaction mixture by filtration, yielding 9.2 grams. On analysis the polymer was found to contain 75.8 percent acrylonitrile based on analysis. The polymers can be mixed with polyacrylonitrile in all proportions and dissolved to give stable solutions which do not separate into distinct layers on standing, and from which fibers and films of homogeneous character can be spun, extruded or cast.

In the preceding description and examples, compositions or polymers have been described which were prepared by homopolymerizing the modifying compounds i. e. the acrylamides, maleamides, fumaramides, itaconamides, citraconamides, maleamates, fumaramates, itaconamates, citraconamates, acrylates and vinyl carboxylic esters were in every case polymerized alone without any other monoethylenically unsaturated, polymerizable monomer being present. Only in the case of the acrylonitrile polymerization was it shown that it could be polymerized alone, i. e., homopolymerized, or polymerized together with a different monoethylenically unsaturated, polymerizable monomer, i. e., copolymerized. However, it is within the purview of my invention to also copolymerize any one of the above modifying compounds, i. e. the acrylamides, maleamides, fumaramides, etc. with a different monoethylenically unsaturated, polymerizable monomer, in any one of the three steps of polymerization, the preferred order being for the initial polymerization one of the above modifying compounds plus a different monomer, for the second step of polymerization a different one of the above modifying compounds plus a different monomer, and for the third and final step of polymerization acrylonitrile plus a different monomer. It will be understood, of course, that the different monoethylenically unsaturated, polymerizable monomer can be omitted from any one of the three polymerization steps, to give other species of the invention.

The resinous compositions or polymers of the invention are all compatible with each other, with polyacrylonitrile and with other acrylonitrile polymers containing 85 percent or more by weight of acrylonitrile, in all proportions, but the most useful mixtures comprise from 5 to 95 parts by weight of one or more of the polymers of the invention with from 95 to 5 parts by weight of polyacrylonitrile, good quality fibers being spinnable from such mixtures dissolved in one or more of the known acrylonitrile polymer solvents. The solutions or dopes of the polymers alone or in admixture with polyacrylonitrile or other acrylonitrile polymers, with or without added fillers, pigments, dyes, plasticizers, etc., as desired, can also be coated onto a smooth surface to give flexible and tough films and sheet materials, which are useful for photographic film support and other purposes. Such compositions are also useful as overcoating materials. The concentration of polymer in the dopes can be varied depending upon the intended uses, for example, from 20 to 40 percent where the dope is to be used for spinning fibers.

Other solvents which can be used for the preparation of fibers and coating compositions, etc. from the new resinous compositions or polymers of the invention, and mixtures thereof with each other with polyacrylonitrile or with acrylonitrile polymers containing 85 percent or more of acrylonitrile, include ethylene carbonate, ethylene carbamade, γ-butyrolactone, N-methyl-2-pyrrolidone, N,N-dimethyl cyanamide, N,N-dimethyl cyanoacetamide, N,N-dimethyl-β-cyanopropionamide, glycolonitrile (formaldehyde cyanohydrin), malononitrile, ethylene cyanohydrin, dimethylsulfoxide, dimethyl sulfone, tetramethylene sulfone, tetramethylene sulfoxide, N-formyl pyrrolidine, N-formyl morpholine, N,N'-tetramethylene methanephosphonamide, and the like. Generally speaking, I have found that N,N-dimethyl formamide and N,N-dimethyl acetamide are particularly advantageous solvents.

What I claim is:
1. A process for preparing resinous compositions comprising heating in the presence of a polymerization catalyst a dispersion containing as the sole polymerizable component from 1 to 10 parts by weight of a monomeric compound (I) selected from the group consisting of those represented by the following general formulas:

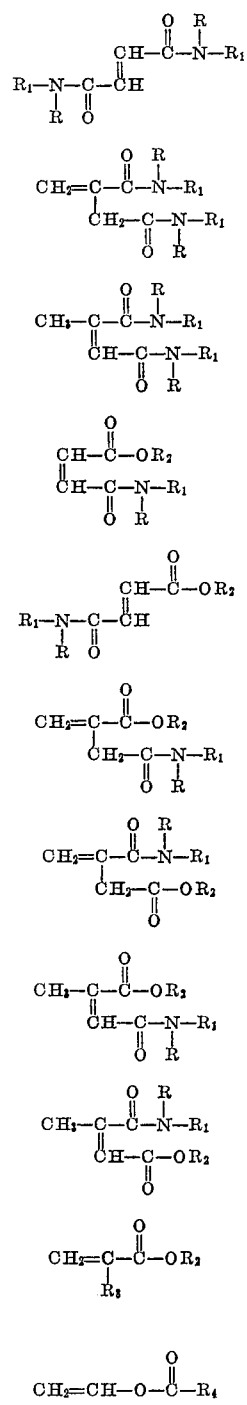

wherein R and $R_1$ each represents a member selected from the group consisting of a hydrogen atom and an alkyl group containing from 1 to 4 carbon atoms, $R_2$ represents an alkyl group containing from 1 to 4 carbon atoms, $R_3$ represents a member selected from the group consisting of a hydrogen atom and a methyl group and $R_4$ represents an alkyl group containing from 1 to 3 carbon atoms, until the monomer has substantially completely homopolymerized, adding to the polymerization reaction mixture containing the unseparated homopolymer from 1 to 10 parts by weight of a different monomer selected from those represented by the above compound formulas, and heating the reaction mixture until the added monomer has substantially completely polymerized, then adding to the polymerization reaction mixture containing the composite polymer from 1 to 40 parts by weight of a member selected from the group consisting of acrylonitrile and an acrylonitrile mixture consisting of from 85.0 to 99.5 percent by weight of acrylonitrile and from 15.0 to 0.5 percent by weight of a different monoethylenically unsaturated, polymerizable compound containing a

—CH=C< group, and heating the reaction mixture until the added monomer has polymerized.

2. A process for preparing resinous compositions comprising heating in the presence of a peroxide polymerization catalyst a dispersion of from 1 to 10 parts by weight of N-isopropyl acylamide, until the N-isopropyl acrylamide has substantially completely homopolymerized, adding to the polymerization reaction mixture containing the homopolymer from 1 to 10 parts by weight of acrylamide, and heating the reaction mixture until the added monomer has substantially completely polymerized, and then adding to the polymerization reaction mixture containing the composite polymer from 1 to 40 parts by weight of a mixture consisting of from 85.0 to 99.5 percent by weight of acrylonitrile and from 15.0 to 0.5 percent by weight of a different monoethylenically unsaturated compound containing a —CH=C< group, and heating the reaction mixture until the added monomers have polymerized.

3. A process for preparing resinous compositions comprising heating in the presence of a peroxide polymerization catalyst a dispersion of from 1 to 10 parts by weight of N,N'-diisopropyl fumaramide, until the N,N'-diisopropyl fumaramide has substantially completely homopolymerized, adding to the polymerization reaction mixture containing the homopolymer from 1 to 10 parts by weight of N-methyl methacrylamide and heating the reaction mixture until the added monomer has substantially completely polymerized, and then adding to the polymerization reaction mixture containing the composite polymer from 1–40 parts by weight of acrylonitrile, and heating the reaction mixture until the added monomer has polymerized.

4. A process for preparing resinous compositions comprising heating in the presence of a peroxide polymerization catalyst a dispersion of from 1 to 10 parts by weight of itaconamide, until the itaconamide has substantially completely polymerized, adding to the polymerization reaction mixture containing the homopolymer from 1 to 10 parts by weight of acrylamide, and heating the reaction mixture until the added monomer has substantially completely polymerized, and then adding to the polymerization reaction mixture containing the composite polymer from 1 to 40 parts by weight of acrylonitrile, and heating the reaction mixture until the added monomer has polymerized.

5. A process for preparing resinous compositions comprising heating in the presence of a peroxide polymerization catalyst a dispersion of from 1 to 10 parts by weight of citraconamide, until the citraconamide has substantially completely polymerized, adding to the polymerization reaction mixture containing the homopolymer from 1 to 10 parts by weight of itaconamide and heating the reaction mixture until the aded monomer has substantially completely polymerized, and then adding to the polymerization reaction mixture containing the composite polymer from 1 to 40 parts by weight of acrylonitrile, and heating the reaction mixture until the added monomer has polymerized.

6. A process for preparing resinous compositions comprising heating in the presence of a peroxide polymerization catalyst a dispersion of from 1 to 10 parts by weight of vinyl acetate, until the vinyl acetate has substantially completely polymerized, adding to the polymerization reaction mixture containing the homopolymer from 1 to 10 parts by weight of N-methyl methacrylamide and heating the reaction mixture until the added monomer has substantially completely polymerized, and then adding to the polymerization reaction mixture containing the composite polymer from 1 to 40 parts by weight of acrylonitrile, and heating the reaction mixture until the added monomer has polymerized.

7. A modified resinous polymer and having the structure and composition of a polymer obtained in accordance with the process of claim 1.

8. A modified resinous polymer and having the structure and composition of a polymer obtained in accordance with the process of claim 2.

9. A modified resinous polymer and having the structure and composition of a polymer obtained in accordance with the process of claim 3.

10. A modified resinous polymer and having the structure and composition of a polymer obtained in accordance with the process of claim 4.

11. A modified resinous polymer and having the structure and comopsition of a polymer obtained in accordance with the process of claim 5.

12. A modified resinous polymer and having the structure and composition of a polymer obtained in accordance with the process of claim 6.

13. A process for preparing resinous compositions according to the process of claim 1, wherein the compound (I) is an acrylamide containing from 3 to 12 carbon atoms and containing no substituent other than alkyl groups of from 1 to 4 carbon atoms, wherein the monomer added to the homopolymer of said compound (I) is a different acrylamide containing from 3 to 12 carbon atoms and containing no substituent other than alkyl groups of from 1 to 4 carbon atoms, and wherein the added acrylonitrile member is a mixture consisting of from 85.0 to 99.5 percent by weight of acrylonitrile and from 15.0 to 0.5 percent by weight of a different monoethylenically unsaturated compound containing a —CH=C< group.

14. A process for preparing resinous compositions according to the process of claim 1, wherein the compound (I) is a fumaramide containing from 4 to 20 carbon atoms and containing no substituent other than N-alkyl groups of from 1 to 4 carbon atoms, wherein the different monomer added to the homopolymer of said compound (I) is an acrylamide containing from 3 to 12 carbon atoms and containing no substituent other than alkyl groups of from 1 to 4 carbon atoms, and wherein the acrylonitrile member is acrylonitrile.

15. A process for preparing resinous compositions according to the process of claim 1, wherein the compound (I) is an itaconamide of from 5 to 21 carbon atoms and containing no substituent groups other than N-alkyl groups of from 1 to 4 carbon atoms, wherein the different monomer added to the homopolymer of said compound (I) is an acrylamide containing from 3 to 12 carbon atoms and containing no substituent groups other than alkyl groups of from 1 to 4 carbon atoms, and wherein the acrylonitrile member is acrylonitrile.

16. A process for preparing resinous compositions according to the process of claim 1, wherein the compound (I) is a citraconamide containing from 5 to 21 carbon atoms and containing no substituent groups other than the N-alkyl groups of from 1 to 4 carbon atoms, wherein the different monomer added to the homopolymer of said compound (I) is an itaconamide containing from 5 to 21 carbon atoms and containing no substituent other than N-alkyl groups of from 1 to 4 carbon atoms, and wherein the acrylonitrile member is acrylonitrile.

17. A process for preparing resinous compositions according to the process of claim 1, wherein the compound (I) is a vinyl carboxylic lower alkyl ester containing not more than 6 carbon atoms, wherein the different monomer added to the homopolymer of compound (I) is an acrylamide containing from 3 to 12 carbon atoms and containing no substituent other than alkyl groups of from 1 to 4 carbon atoms, and wherein the acrylonitrile member is acrylonitrile.

No references cited.